United States Patent
Watkins

[11] Patent Number: 6,049,857
[45] Date of Patent: Apr. 11, 2000

[54] APPARATUS AND METHOD FOR TRANSLATING ADDRESSES UTILIZING AN ATU IMPLEMENTED WITHIN A NETWORK INTERFACE CARD

[75] Inventor: John E. Watkins, Sunnyvale, Calif.

[73] Assignee: Sun Microsystems, Inc., Mountain View, Calif.

[21] Appl. No.: 09/121,647

[22] Filed: Jul. 23, 1998

Related U.S. Application Data

[62] Division of application No. 08/672,982, Jul. 1, 1996, Pat. No. 5,983,332.

[51] Int. Cl.[7] ............................................ G06F 12/10
[52] U.S. Cl. .......................... 711/207; 711/135; 711/163; 711/210
[58] Field of Search .................................... 711/202, 207, 711/210, 135, 163; 395/200.57, 220.8; 707/10

[56] References Cited

U.S. PATENT DOCUMENTS

| | | | |
|---|---|---|---|
| 4,488,256 | 12/1984 | Zolnowsky et al. .................... | 711/210 |
| 5,155,825 | 10/1992 | Moughanni et al. .................... | 711/207 |
| 5,283,876 | 2/1994 | Tague ........................................ | 711/207 |
| 5,613,071 | 3/1997 | Rankin et al. ............................ | 707/10 |
| 5,666,514 | 9/1997 | Cheriton ................................... | 711/144 |
| 5,751,951 | 5/1998 | Osborne et al. ...................... | 395/200.8 |
| 5,784,708 | 7/1998 | Bridges et al. ......................... | 711/207 |
| 5,815,664 | 9/1998 | Asano .................................. | 395/200.57 |
| 5,818,842 | 10/1998 | Burwell et al. .......................... | 370/397 |
| 5,845,325 | 12/1998 | Loo et al. ................................ | 711/135 |
| 5,845,331 | 12/1998 | Carter et al. ............................ | 711/163 |

*Primary Examiner*—Eddie P. Chan
*Assistant Examiner*—Than Nguyen
*Attorney, Agent, or Firm*—Blakely Sokoloff Taylor & Zafman

[57] ABSTRACT

An apparatus and method for translating a virtual address to a physical address utilizing an address translation unit implemented within a network interface card is described. The address translation unit of the present invention is utilized in a computer system. The computer system comprises a first bus; processors with embedded caches and memory coupled to the first bus; a second bus; a network logic coupled to the second bus, wherein the network logic includes an address translation unit; and a bus bridge coupled to the first bus and to the second bus.

27 Claims, 11 Drawing Sheets

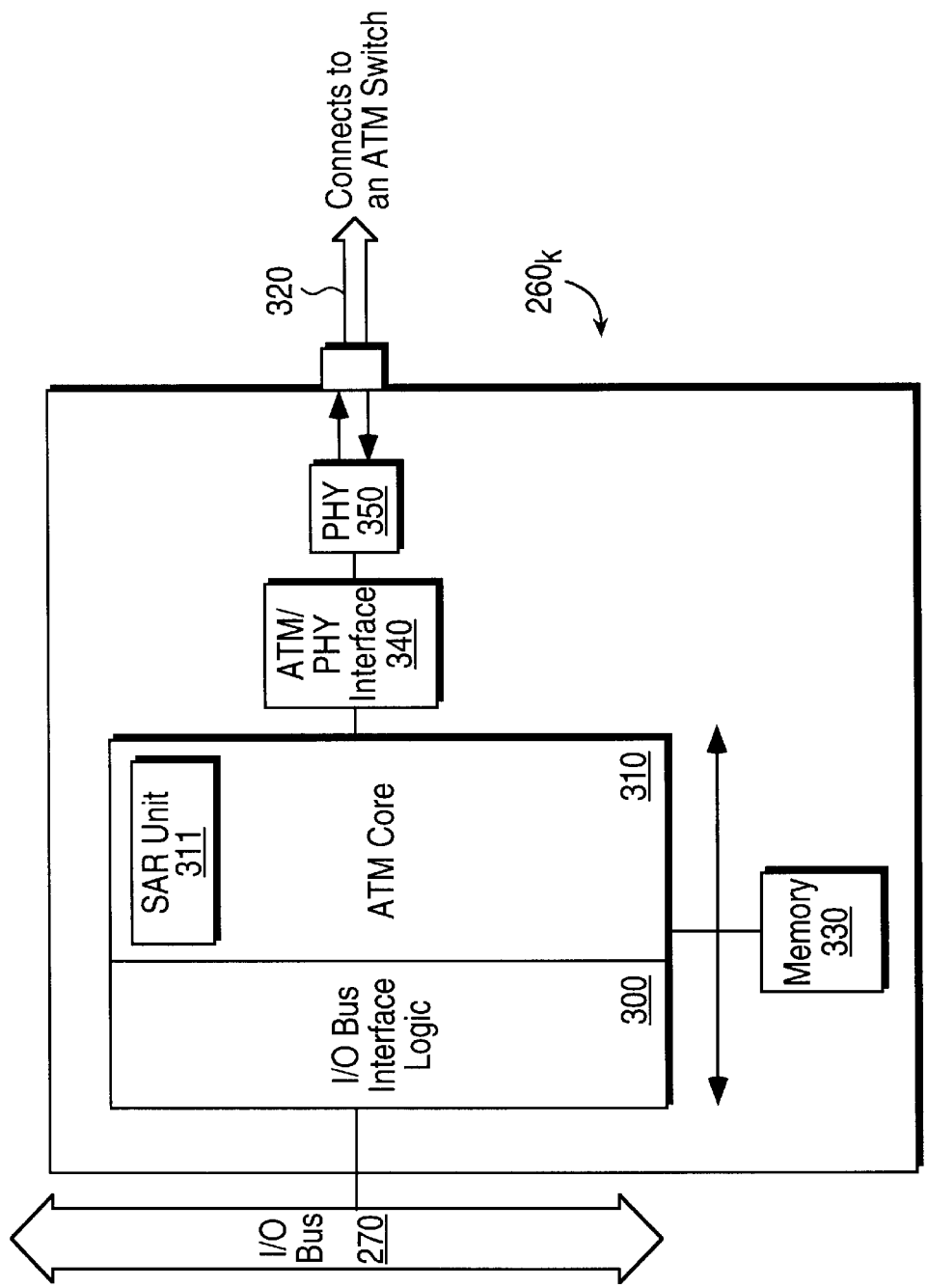

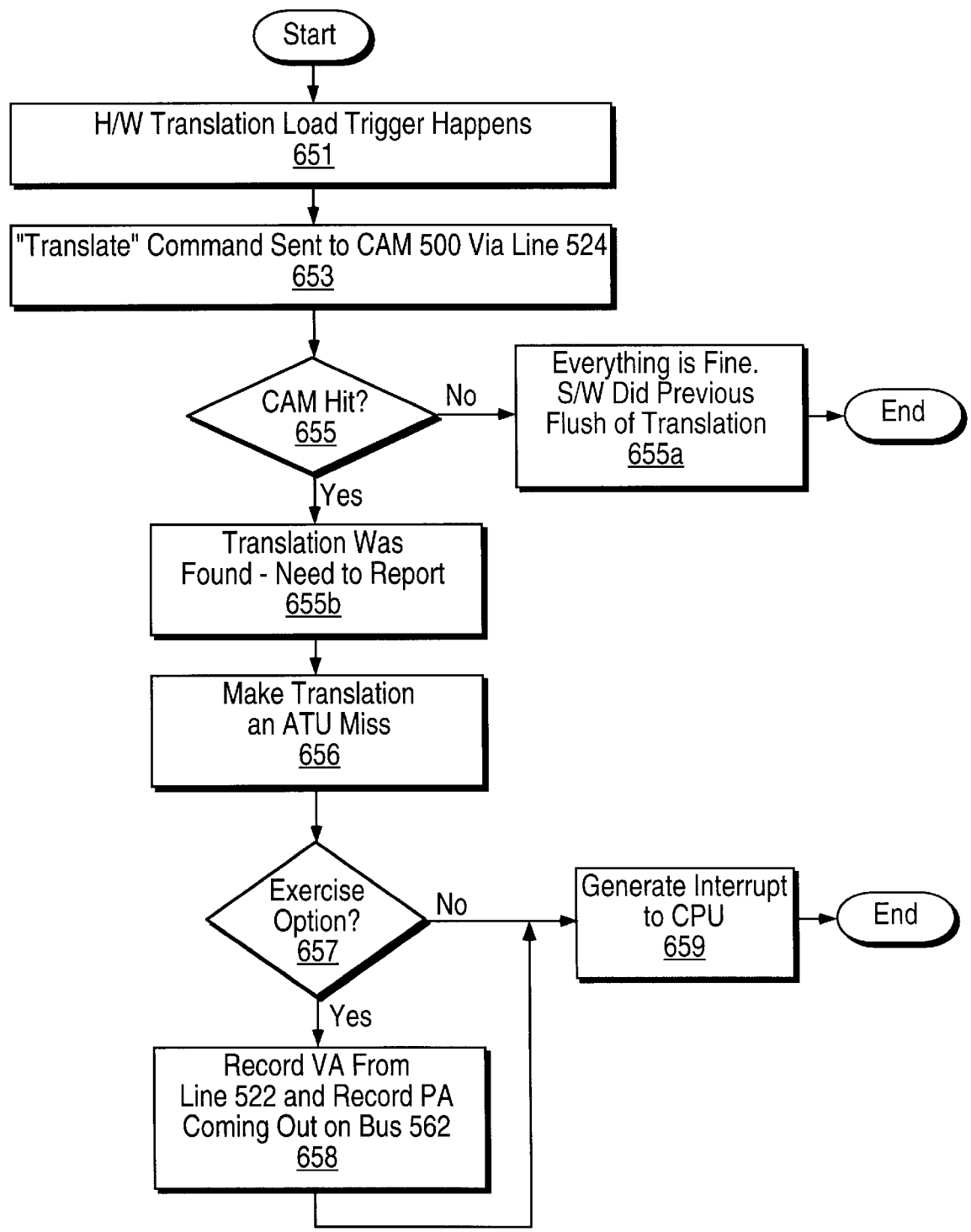

APPARATUS AND METHOD FOR TRANSLATING ADDRESSES UTILIZING AN ATU IMPLEMENTED WITHIN A NETWORK INTERFACE CARD

This application is a divisional application of the application Ser. No. 08/672,982 filed Jul. 1, 1996, now U.S. Pat. No. 5,983,332 now pending.

BACKGROUND OF THE INVENTION

1. Field of the Invention

The present invention relates to the field of data transfer. More particularly, the present invention relates to the architecture of an address translation unit that is implemented within network logic and a method of using the address translation unit.

2. Description of Art Related to the Invention

For over a decade, a number of system architectures have been developed with input/output ("I/O") devices accessing main memory through direct virtual memory accesses ("DVMAs") using virtual addresses, instead of direct memory accesses ("DMAs") using physical addresses. One advantage associated with DVMA systems has been the simplification of data accesses by the I/O device. For example, I/O devices accessing memory through DMAs ("DMA I/O devices") must be controlled to "scatter" (i.e., allocate) data to a number of potentially discontiguous physical pages as well as to "gather" data. Gathering data that exceeds one page in length is normally accomplished by accessing a group of potentially discontiguous physical pages. In contrast, I/O devices that access main memory through DVMAs ("DVMA I/O devices") do not require such control because data accesses are made through contiguous virtual pages.

Although the DVMA systems simplified this "scatter-gather" problem, these systems required that the virtual addresses issued by the DVMA I/O devices be translated into physical addresses before data could be accessed from main memory. As shown in FIG. 1, a conventional DVMA system 100 utilizes an I/O Memory Management Unit ("I/O MMU"), sometimes referred to as an I/O Translation Lookahead Buffer 110, to translate virtual addresses to physical addresses utilized by main memory 120. As shown, the I/O MMU 110 is implemented within a bridge element 130 that couples an I/O bus 140 and a system bus 150. Normally, the I/O MMU 110 is often configured to contain a limited number "r" of address mappings (e.g., 16 fully-associative entries) to increase system performance with minimal additional costs. Thus, a plurality of I/O DVMA devices $160_1$–$160_i$ ("i" being a whole number, i≧2) are restricted to collectively use at most "r" virtual pages without mitigating system performance. If a requested address mapping is not contained within I/O MMU 110, resulting in an I/O MMU "miss", then I/O MMU 110 must engage in a table walk in order to obtain (fetch) the requested address mapping from main memory 120 which contains all potential address mappings. "Table walking" is defined as utilizing sequentially indexed tables in memory in order to find a particular translation. Thus, it may take the I/O MMU 110 much longer to execute a transaction when there is an I/O MMU "miss" compared to a "hit." Thus, overall system 100 performance is degraded when the frequency of I/O MMU misses is high.

With the emergence of multi-media communications, networks are now being required to support multiple data types. As a result, network manufacturers are tending to concentrate their efforts toward asynchronous transfer mode ("ATM") networks. In ATM networks, a large number of virtual channels, perhaps tens or hundreds, can be in operation simultaneously. Hence, if the DVMA system 100 is configured to support an ATM network coupled to I/O network interface logic 170, it would experience significant performance degradation caused by excessive fetching of address mappings from main memory. For example, an ATM link intended to sustain 622 megabits per second ("Mbs") unidirectional may decrease to a rate considerably less than 622 Mbs because of the Network Interface Logic's inability to transfer data to or from memory at that rate with excessive I/O MMU "misses" and resulting table walks.

Hence, it would be advantageous to develop an address translation unit ("ATU") implemented within and operating in cooperation with a Network Interface Card ("NIC") coupled to the I/O bus 140 such that the need for I/O MMU 110 to engage in table walking is mitigated. The NIC is used to interconnect the ATM network environment to the DVMA system.

SUMMARY

The present invention describes an apparatus and a method for translating a virtual address to a physical address utilizing an address translation unit implemented in a network interface card.

According to a preferred embodiment, the address translation unit (ATU) is utilized within the context of a computer system. The computer system comprises a first bus; processors with embedded caches and memory coupled to the first bus; a second bus; a network logic coupled to the second bus, wherein the network logic includes an address translation unit; and a bus bridge coupled to the first bus and to the second bus.

The bus bridge includes an I/O MMU (Input/Output Memory Management Unit) which is also capable of translating a virtual address to a physical address. The address translation unit may transmit a virtual address to the bus bridge which the bus bridge will then translate into its corresponding physical address. In another case, the address translation unit may issue a translated physical address and bypass the I/O MMU in the bus bridge. This results in increased system performance.

In another embodiment, the address translation unit which is a part of a network interface card will comprise a first memory element which is configured to receive a virtual address to be translated and a second memory element configured to receive a physical address that is affiliated with the virtual address. Within the ATU, the second memory element is coupled to the first memory element.

Moreover, the address translation unit may be controlled by a state machine and is coupled to a computer system via an I/O bus. According to a preferred embodiment, address translation unit comprises a CAM element and a RAM element One method of utilizing the address translation unit comprises the following steps: providing a condition that causes the state machine to leave a first state and to enter a second state; and causing the state machine to issue a set of instructions to the address translation unit so that the address translation unit executes a cycle. The address tnanslation unit may perform the following cycles: translate, hardware translation load, software translation load, software flush, flush check and various diagnostic access modes.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 is a block diagram of a network interface card utilized in one embodiment of the computer system of FIG. 2A.

FIG. 6F is a flow chart that illustrates a flush check cycle of the address translation unit.

DETAILED DESCRIPTION

An address translation unit ("ATU") implemented within an asynchronous transfer mode ("ATM") network interface card ("NIC") that is coupled to a DVMA system is described. In the following description, numerous specific details are given to provide a thorough understanding of the invention, such as the use of a multiplexer or the use of a PCI bus. However, it will be apparent to one skilled in the art that the invention may be practiced without these specific details. In order to avoid obscuring the present invention, some well-known circuits or system configurations are not disclosed in detail.

A number of terms are frequently used herein to describe certain control circuits and binary representations which are defined herein. A "word" is preferably 4 bytes (32-bits) in length, but may be any "$2^x$" byte in length (where $x \geq 0$). A "packet" is a plurality of words stored, transmitted or received in succession. An "address translation" is a mapping between a virtual address and a physical address. A "flush" operation is a removal of an address translation from one or more storage locations. The term "asserted" is defined as the activation or setting of a preselected logic value. Moreover, a "virtual address" may be construed as the entire virtual address or a portion thereof (eg., a virtual page number). Likewise, a "physical address" may be construed as the entire physical address or a portion thereof (e.g., a physical page number).

Figure 1:
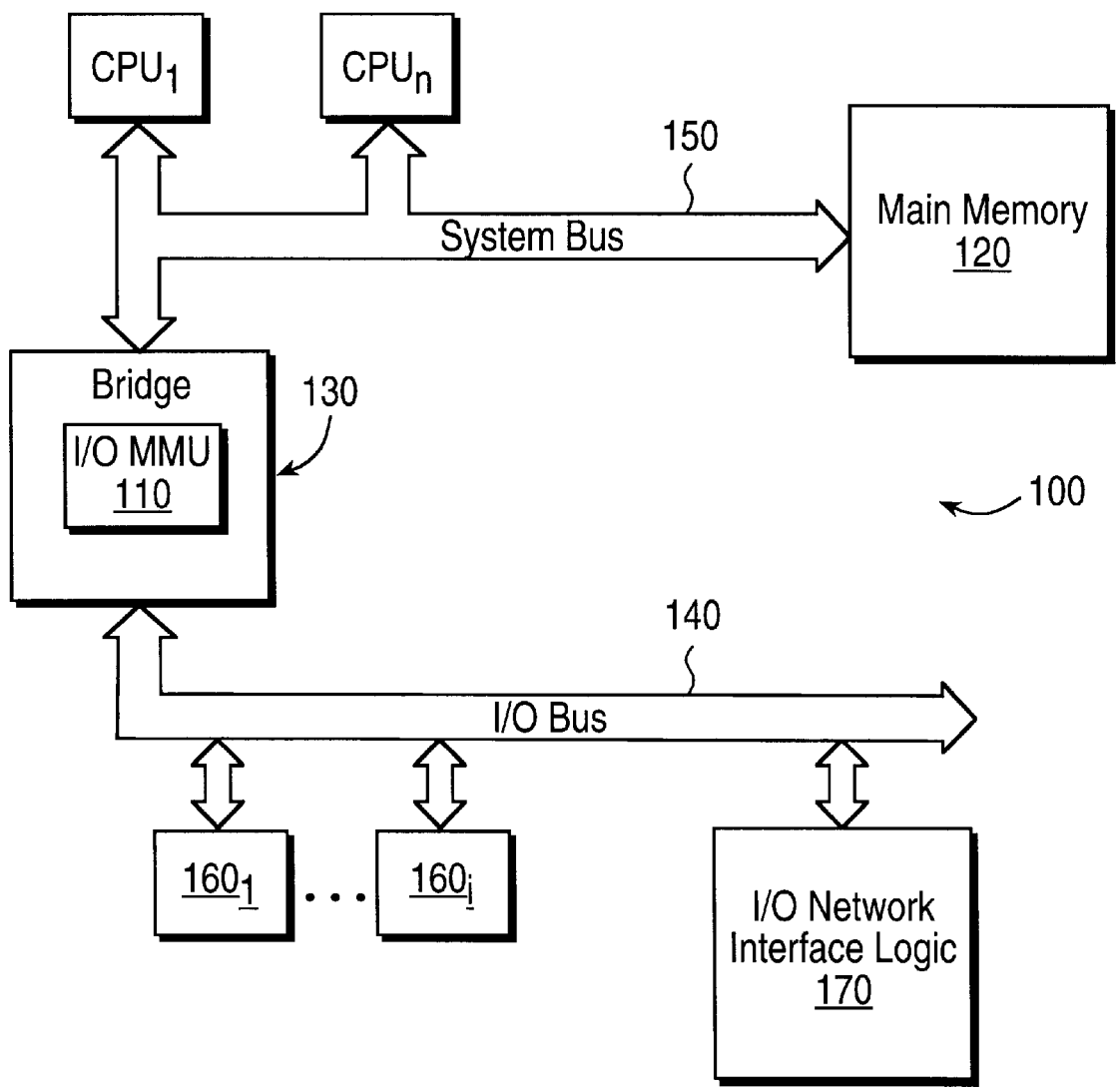
FIG. 1 illustrates a block diagram of a prior art system.
Figure 2A:
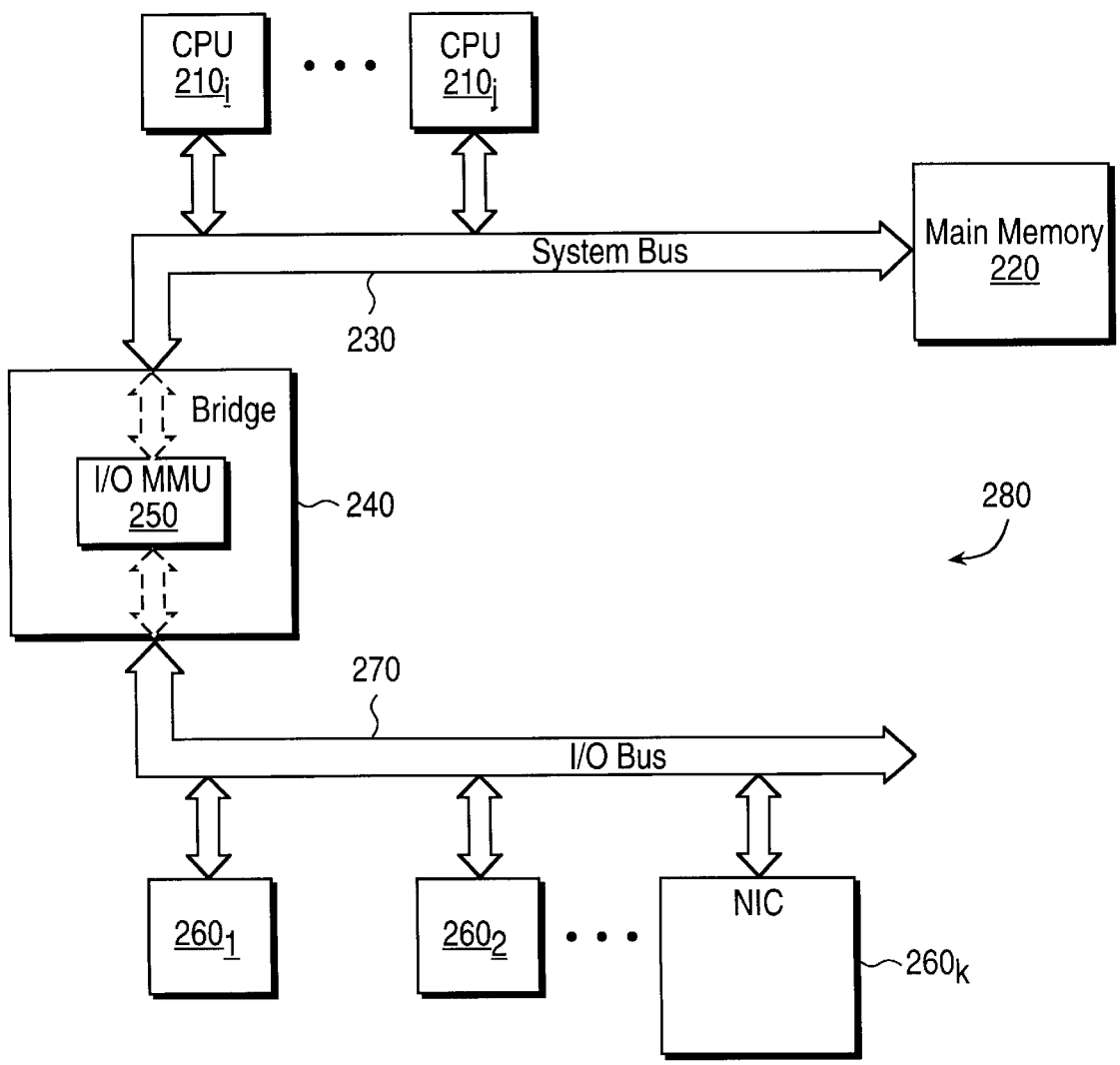
FIG. 2A illustrates a computer system utilizing the present invention.

Referring to FIG. 2A, an embodiment of an electronic system 200 such as, for example, a workstation manufactured by Sun Microsystems of Mountain View, Calif., is illustrated. The electronic system 200 operates as a DVMA system, although it is contemplated that the present invention may function in conjunction with a DMA type system.

As shown, the electronic system 200 comprises one or more multiprocessors $210_1$–$210_j$ ("j" being whole number, $j \geq 1$) coupled to main memory 220 through a memory bus 230 to enable communications therebetween. The memory bus 230 is further coupled to a bridge element 240, including an I/O MMU 250, to enable communications between components coupled to the system bus 230 (e.g., main memory 220, microprocessor(s) $210_1$–$210_j$, etc.) and a plurality of I/O devices $260_1$–$260_k$ ("k" being whole number, $k \geq 2$) coupled to an I/O bus 270. The I/O bus 270 may include, but is not limited to, a Peripheral Component Interconnect ("PCI") bus developed by Intel Corporation of Santa Clara, Calif. For example, the PCI bus may support 64-bit address/data propagation at approximately 66 megahertz ("MHz") or 32-bit address/data propagation at approximately 33 MHz.

Although not shown, the main memory 220 includes a plurality of free memory buffers, a Receive ("RX") descriptor ring and a RX Completion ring to support RX operations (not shown). Likewise, there are similar elements to support Transmit ("TX") operations. Normally, the buffers are storage locations consecutively addressed in virtual memory, but are not necessarily contiguous in physical memory. The buffers may be of various sizes, occupying one or more virtual pages. Each descriptor ring includes a plurality of descriptors, one of these descriptors being shown in FIG. 2B.

Figure 2B:
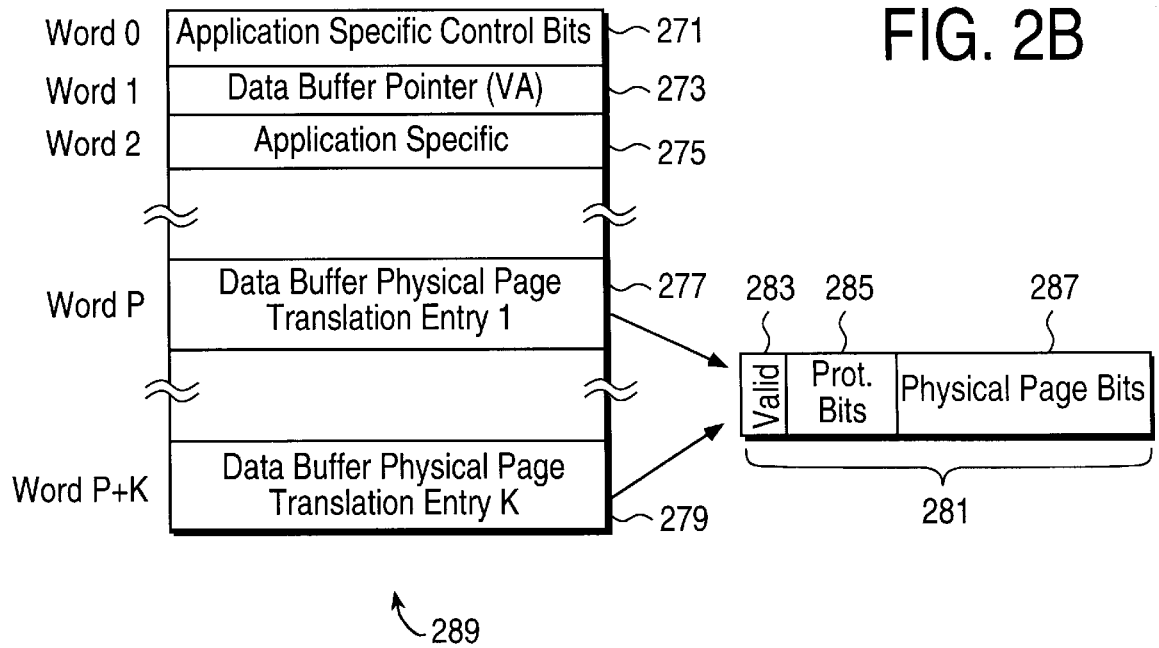
FIG. 2B illustrates a sample descriptor.

Referring now to FIG. 2B, a sample descriptor format 289, which is a basic data structure that can be used by a Segment and Reassembly ("SAR") unit to transport packet data between main memory 220 and the network, is shown. In one embodiment, descriptors are arranged (64 bytes apart between each descriptor) in a ring structure (which is not shown). These descriptors point to a set of data packets to be sent to the network (in the transmit case) or the descriptors point to a set of free memory buffers to hold incoming packets (in a receive case). In one embodiment, each descriptor is of a fixed length and comprises a plurality of words, ranging between three and sixteen contiguous 32 bit words. The descriptors are placed consecutively in virtual memory in a ring structure. Each of these descriptors, which are located in main memory, point to a data buffer (in the transmit ("TX") case) which is also located in main memory.

As shown in block 271 of the descriptor 289, word 0 contains application specific control bits. Block 273 illustrates that word 1 contains a virtual address ("VA") pointer which points to the beginning of a data buffer. Block 275 shows that word 2 of the descriptor 289 contains application specific information. The end of the descriptor 277 and 279 contains information on the physical page location of the physical address ("PA") that maps to the virtual address contained in block 273 and associated with this descriptor 289. Block 277 illustrates that word "P" contains a translation entry 1 for the first physical page. Each physical page of the physical address contains its own entry. In one embodiment, the last word "P+K", where "P" is a predetermined number greater than 2, and "K" is the number of pages the data buffer spans −1 as illustrated by block 279. If a data buffer spans ten pages, then there will be ten translation entries at the end of descriptor 289. Thus, caching the PA of objects greater than one page size is supported by embedding multiple translations within a descriptor.

A sample physical translation format 281 is also shown in FIG. 2B. In one embodiment, this format 281 includes a valid bit 283, protection bits 285 and the actual physical page bits 287. The valid bit 283, in the descriptor, determines if a specific translation entry will be placed into the ATU (if valid bit 283 is set) or ignored (if valid bit 283 is cleared). The protection bits 285 are transferred through control line 560 of FIG. 5 in determining whether a page is accessible using the ATU's physical translation for the virtual address. For instance, a read-only page can be protected from writes with a read only page protection bit. The physical page bits 287 provide the virtual to physical address mapping for the corresponding portion of the data buffer in virtual address space. The data buffer pointed to by the data buffer pointer 273 can span one or more virtual pages and are not necessarily contiguously placed in physical memory.

Referring to FIG. 3, one of the plurality of I/O devices, for example I/O device 260$_k$, includes a Network Interface Circuit ("NIC"). The NIC 260$_k$ includes I/O bus interface logic 300 and an ATM core 310, both of which collectively operate to transfer data between the electronic system and other remotely located electronic systems through multiple virtual channels normally utilizing full duplex media 320. The media 320 may include optical fiber, twisted pair or any other high speed communication medium normally supporting a transfer rate of 155 million bits per second ("Mbps"), 622 Mbps, or even at speeds faster than 622 Mbps.

The ATM core 310 features a segmentation and reassembly ("SAR") unit 311 which facilitates segmentation and reassembly of data cells (e.g., a standard ATM cell absent a checksum byte) and utilizes offcip memory 330 for storage. The ATM core 310 exchanges data cells with an ATM/physical interface 340 conforming to the well-known Universal Test and Operations Physical Interface for ATM ("UTOPIA") standard. The ATM/physical interface 340 is positioned to insert a checksum in a header of an out-going data cell to produce an ATM cell or to calculate whether the checksum of an in-coming ATM cell is correct, and if so, removing the checksum before transferring the data cell into the ATM core 310. A physical layer 350 is implemented for proper electrical voltage line termination. A description of the ATM core may be found in a co-pending U.S. patent application entitled "Method and Apparatus for Coordinating Data Transfer Between Hardware and Software" (application Ser. No. 08/499,317; filed Jul. 7, 1996) by Rasoul Oskouy and Denton E. Gentry. That U.S. patent application is owned by Assignee of the present application.

For ATM cell transmission, the ATM core 310 is initially provided a starting location of the TX descriptor ring. The ATM core 310 fetches the first TX descriptor to obtain the virtual address of the data buffer associated with the first TX descriptor. Next, the data buffer is accessed to propagate data into the SAR unit 311 for segmentation into one or more ATM cells transmitted through the physical media 320. After transmission of the ATM cell(s) (or at least storage of the data in local buffers of SAR unit 311), the SAR unit 311 may acknowledge completion by writing status information to the TX completion descriptor ring and generating an interrupt to the system to alert the processor accordingly.

During reception, incoming ATM cells are reassembled into packets of data which are subsequently stored in free memory buffers indicated by a virtual address pointer contained in its corresponding RX descriptor.

Figure 4:
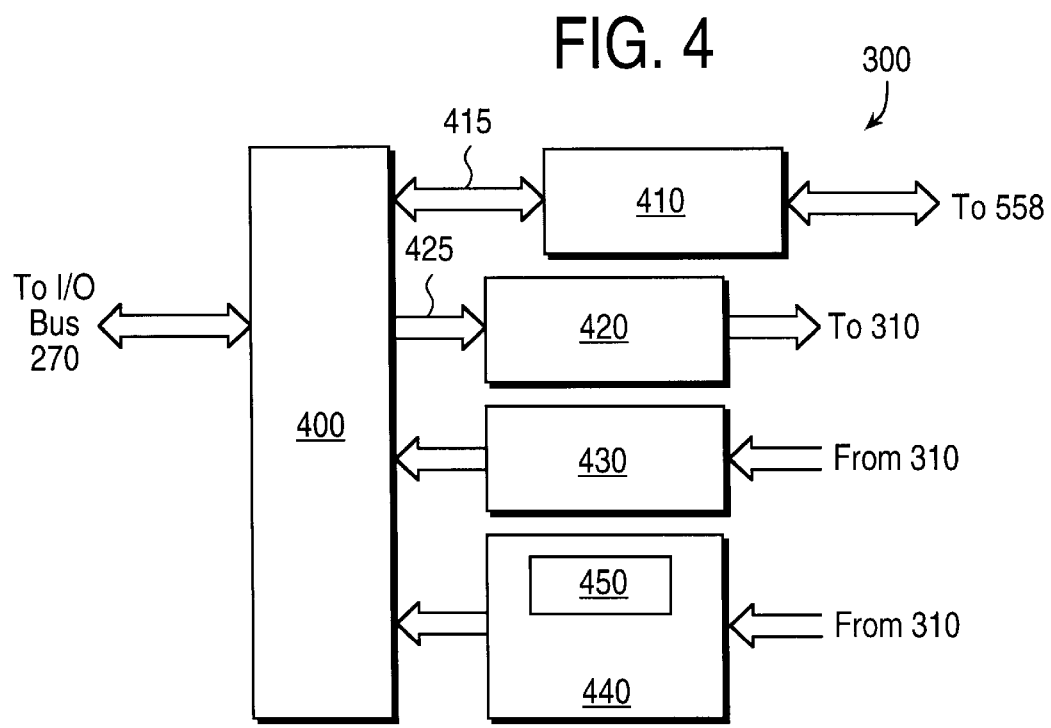
FIG. 4 is a block diagram of the I/O bus interface logic of FIG. 3.
Figure 5:
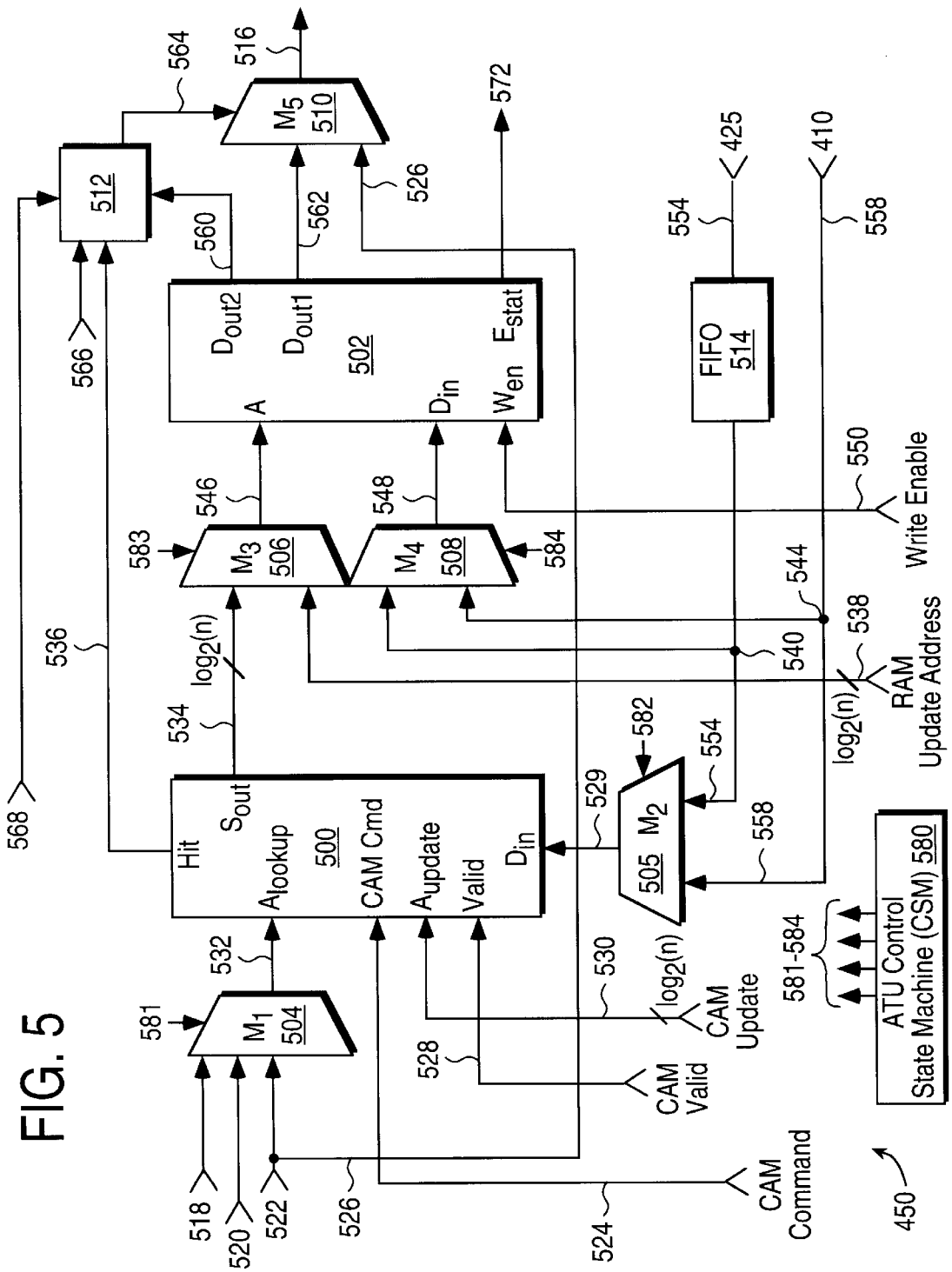
FIG. 5 is a schematic illustration of the address translation unit.

Referring now to FIG. 4, an embodiment of the I/O bus interface logic 300 coupled to the I/O bus 270 (e.g., PCI bus with a 64-bit address/data lines operating at approximately 66 MHz for this embodiment) is shown. The I/O bus interface logic 300 includes I/O registers and transceivers 400 (e.g., PCI I/O registers and transceivers) coupled to at least a slave interface device 410 via an I/O bus line 415, one or more read buffers 420 via an input bus 425, as well as one or more write buffers 430, and a master address generation unit 440. Although not shown, the input bus 425 is further coupled to the master address generation unit 440, namely a FIFO storage element as shown in FIG. 5, to receive descriptor related information. The read buffer(s) 420 is (are) used to temporarily store information from the I/O bus 270 while the write buffer(s) 430 is (are) used to temporarily store information via a write data path from the SAR unit.

Implemented within the master address generation unit 440 is an address translation unit ("ATU") 450 that receives information from the SAR unit 311 of the ATM Core. This information includes the virtual address to be translated, the size of the address and the type of access (e.g., access to descriptor ring or buffer). The presence of the ATU 450 allows the electronic system to (i) translate the virtual address into a physical address and subsequently bypass the I/O MMU 250 of FIG. 2A, or (ii) transmit the virtal address to the I/O MMU 250 of FIG. 2A.

Referring now to FIG. 5, an embodiment of the ATU 450 is shown. The ATU 450 may be configured to be fully associative. However, it is contemplated that another memory access scheme, such as direct mapped or N-way associative, may be utilized in order to meet a desired translation hit rate.

The ATU 450 includes a content addressable memory ("CAM") element 500 and random access memory ("RAM") element 502, which collectively contain "n" address translations ("n" being a whole number, n≧1). More specifically, the CAM element 500 includes logic that supports loading of a virtual address and control information in one of "n" entries as well as performing address lookup searches of the entries. The control information may include a CAM Valid bit indicating, when set, that the entry contains a virtual address currently being used for address translations. The CAM element 500 further includes (i) a plurality of input ports and (ii) a plurality of output ports.

The plurality of input ports are used to load address and control information into the entries of the CAM element 500. As shown, there are five (5) input ports used to load information into the CAM element. The first input port is a data input ("D$_{in}$") port used for loading a selected virtual address provided by a select element (e.g., MUX 505) via address lines 529. The second input port is an address update ("A$_{update}$") port for receiving, via CAM Update address lines 530 an entry number of the entry selected to be loaded with the virtual address on the data lines 529. The third input port is a command ("CAM command") port from which the CAM element 500 receives command information to control its operation via command lines 524. Types of commands include, but are not limited to "Translate" or "Update". In addition, the fourth input port is an entry valid ("Valid") port through which a control line 528, representative of the CAM Valid bit of an entry addressed by the A$_{update}$ port, is asserted or de-asserted depending on if the entry is "valid" (or currently used), or "invalid" (e.g., stale). The fifth input port is an address lookup ("A$_{lookup}$") port from which the CAM element 500 receives a virtual address (e.g., page number) via lookup address lines 532 to be compared with the virtual addresses stored in each of its entries. If a match occurs, an output ("Hit") port and its control line (referred to as "CAM_Hit" 536) is asserted (i.e., an active signal is produced). As a result, a signal out ("$_{out}$") port propagates the entry number of the CAM entry containing the virtual address through signal lines 534.

Referring still to FIG. 5, the RAM element 502 is configured to contain the corresponding physical address for the virtual address stored in CAM element 500. Similar to the CAM element 500, the RAM element 502 includes a plurality of input and output ports. More particularly, the RAM element 502 includes a data input ("$D_{in}$") port used for loading, via data lines 548, a physical address corresponding to the virtual address loaded into the CAM element 500. The RAM element 502 further includes an address ("A") port for entry lookups and entry updates. A write enable ("$W_{en}$") port is used to distinguish between an update (i.e., $W_{en}$ line 550 is asserted) and entry look-up (i.e., $W_{en}$ line 550 is deasserted). In addition, the RAM element 502 includes a first data out ("$D_{out1}$") port to output the physical address corresponding to the virtual address being translated or searched, via address lines 562 and a second data out ("$D_{out2}$") port to output write protection information contained in the selected entry via control line 560. Moreover, the RAM element 502 includes an entry status ("$E_{stat}$") port to provide information indicating which entries of the CAM and RAM elements has been accessed via Entry status lines 572.

In addition to the CAM and RAM elements 500 and 502, the ATU 450 further includes a first group of control logic that controls the loading and flushing of the address translations, and a second group of control logic that controls whether the ATU 400 should output a virtual or physical address via address lines 516. An indicator used to bypass I/O MMU may include, but is not limited to, a high order address bit being set or cleared, a specific subset of the address space being accessed, etc. For example, in one embodiment, the bridge element 240 such as that shown in FIG. 2A provides an address range within the 64-bit address space which when accessed treats the lower 41 bits of the address as a physical address.

As shown, the first group of control logic includes a plurality of select elements 504–506 and 508 (e.g., multiple input multiplexers), and a first-in, first-out ("FIFO") storage element 514. The FIFO storage element 514 is used to temporarily store virtual/physical address translations as they are read from the input bus 425 during descriptor fetches.

The plurality of select elements 504–506 and 508 are controlled by ATU control state machines 580 through control lines 581–584. A first select element 504 is coupled to the $A_{lookup}$ port of the CAM element 500 via lookup address lines 532 in order to route the virtual address to be searched within the CAM element 500. This select element receives as input virtual addresses (or virtual page numbers) through software flush address lines ("SW Flush address lines") hardware flush lines 518, ("HW Flush address lines") 520 and address lines 522 for usual translation loading. The second select element 505 is coupled to the $D_{in}$ port of the CAM element 500 via data lines 529 to load either a (i) virtual address obtained from a descriptor fetch via lines 554, or alternatively, (ii) a virtual address of a data buffer specified manually by software writing into CAM element 500 the buffer's virtual address. This is an access of a slave interface device 410 resulting in that virtual address being placed on lines 558. A third select element 506 is coupled to the address port via address lines 546 to transmit therein either a RAM Update address via a RAM Update address line 538 or an entry number output from the CAM 502 element through the $S_{out}$ port via signal lines 534. The fourth select element 508 is coupled to the $D_{in}$ port via address lines 548 to input physical addresses and control information from lines 540 and 544.

The second group of control logic includes a hit/miss logic circuit 512 and a fifth select element 510. The hit/miss logic circuit 512 is combinatorial logic configured to control whether the fifth select element 510 outputs onto the address lines 516 (i) a translated physical address received from lines 562 or (ii) the virtual address for lines 526 to be subsequently translated by the I/O MMU. Such control is performed by the assertion or de-assertion of an ATU_Hit control line 564.

The translated physical address is output from the fifth select element 510 under all conditions unless (i) the CAM_Hit line 536 is not asserted thereby indicating a "lookup miss", (ii) the ATU 450 is disabled by System software not asserting an ATU enable line 566, (iii) a cycle status line 568 is not asserted indicating that this particular translation should be avoided, or (iv) the protection bits 560 signify that the cycle in progress is prohibited due to reasons including, but not limited to, an attempted write access of a read-only page.

Figure 6A:
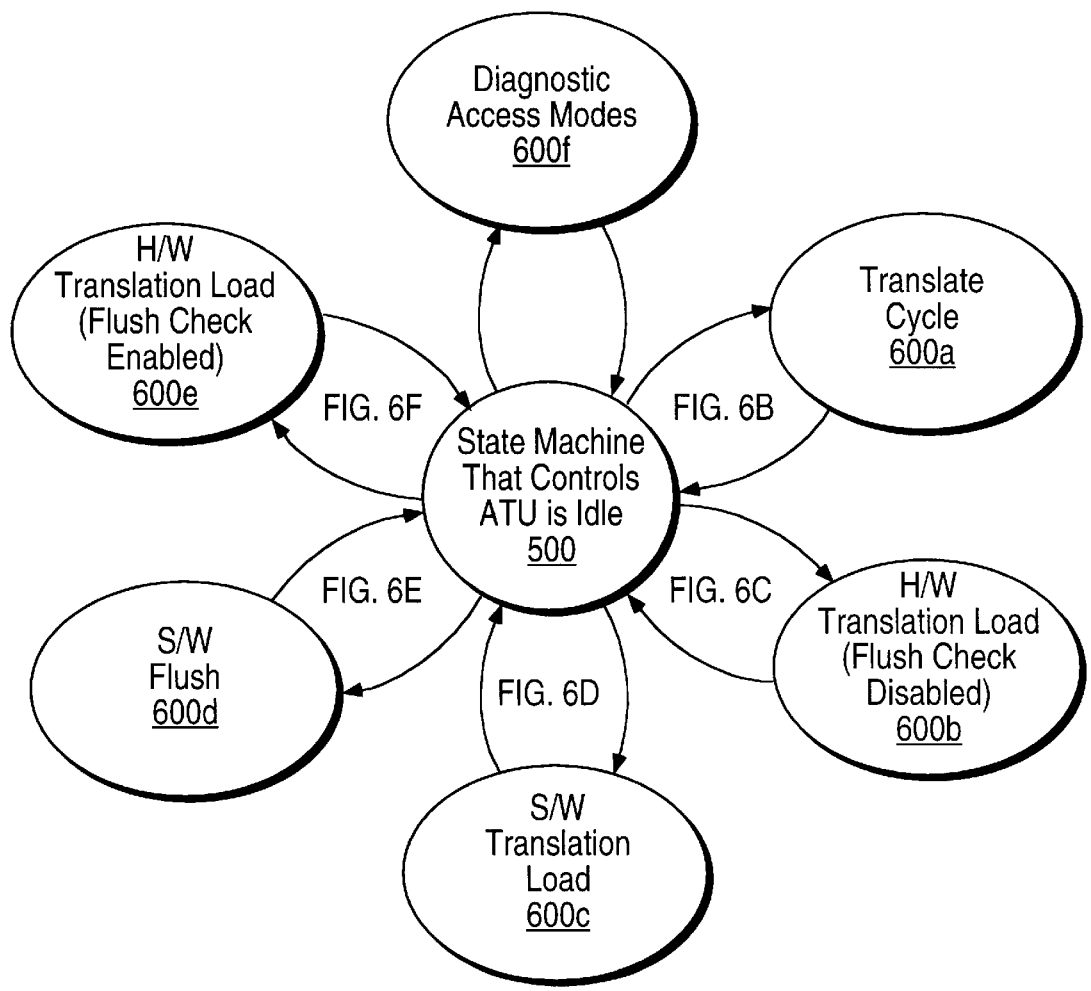
FIG. 6A is a schematic illustration of the ATU state machine.

The functions of the ATU control state machine 580 of FIG. 5 are illustrated in FIG. 6A. The ATU control state machine controls several functions of the ATU 450 depending on the inputs that it receives from the slave interface 410 or the ATM CORE 310. The ATU control state machine 600 may receive a trigger that tells it to go into a translate cycle 600A and then when it has completed the translate cycle 600A, the state machine will return to its idle state 600. The state machine 600 may also receive a trigger to execute a hardware translation load 600B or another signal to execute a software translation load 600C. In addition, the state machine 600 may also leave its idle state to perform a software flush 600D or a flush check 600E. Moreover, the state machine also may go into a diagnostic access mode 600F in which it performs maintenance work, or it may manually read, or write to CAM 500 or RAM 502 or initially set all CAM valid bits 528 to "O" for diagnostic purposes.

Figure 6B:
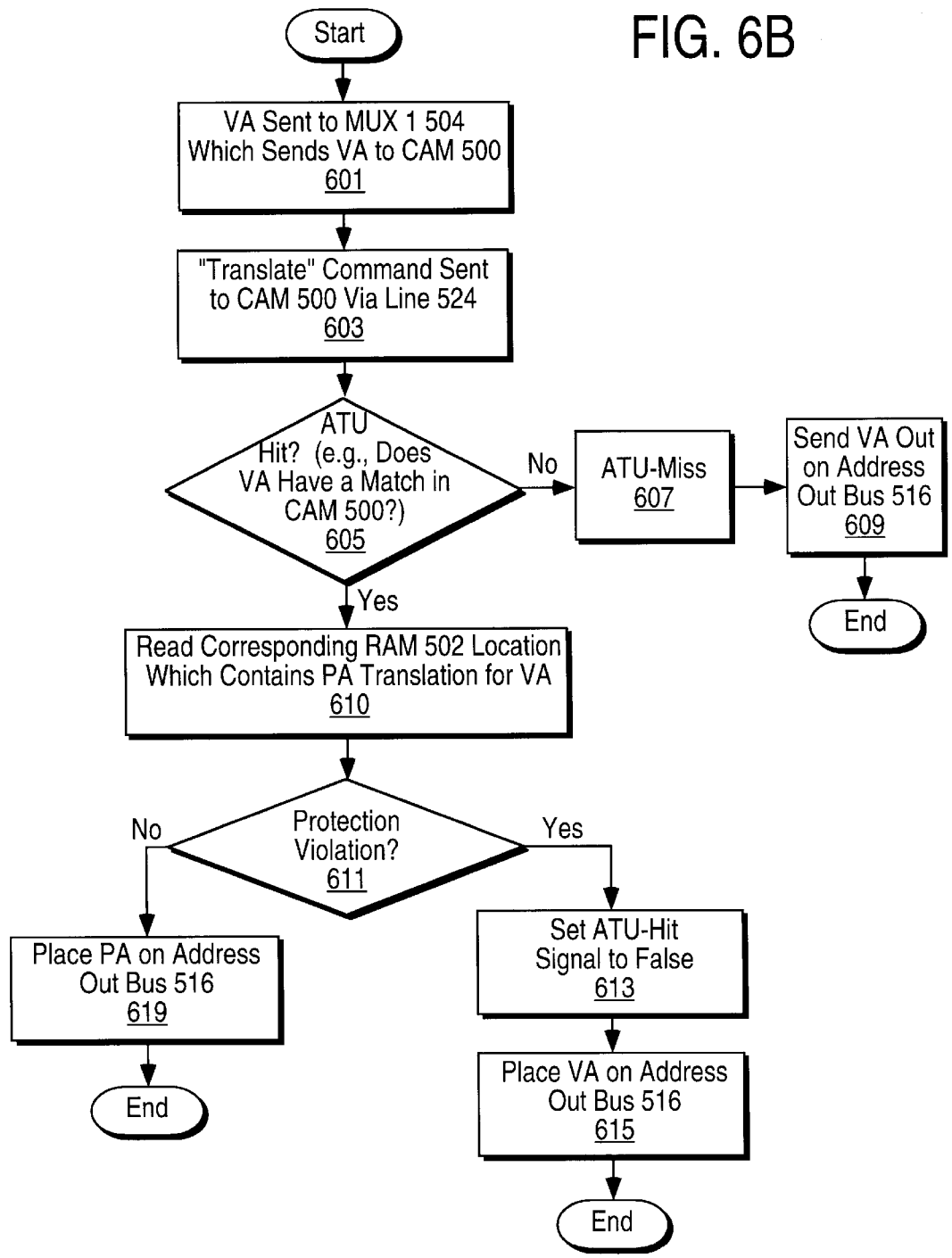
FIG. 6B is a flow chart illustrating a translate cycle of the address translation unit.

The translate cycle 600A is illustrated in a flow chart in FIG. 6B. In step 601, a virtual address 522 is sent to a first select element, such as MUX 504 which then sends the virtual address 532 to CAM 500 as shown in FIG. 5. The next step 603 is to send a TRANSLATE command to CAM 500 via line 524. At decision diamond 605, CAM determines whether there is an ATU-hit. In other words, does the virtual address that came in on line 532 have a matching entry in CAM 500? If not, then in step 607, an ATU miss signal is generated and a virtual address 526 is sent out on address out bus 516 in step 609. The translate cycle then ends at that point.

However, if an ATU-hit is determined by CAM 500 at decision diamond 605, then the next step is 610. A read corresponding to a RAM 502 location is executed. The read corresponds to the physical address translation affiliated with the VA. Then at decision diamond 611, RAM 502 must determine whether there is a protection violation. If there is no protection violation, then in step 619, the physical address (PA) is placed on the address out bus 516 and the translate cycle ends.

If the answer was "yes" to decision diamond 611, then there was a protection violation. In step 613, ATU-hit signal 564 is set to "false". In step 615, the virtual address will then be placed on the address out bus 516. An example of a protection violation is an attempt to write on a read only page. Another option is to have the ATU signal this protection violation by generating an interrupt to the CPU.

Figure 6C:
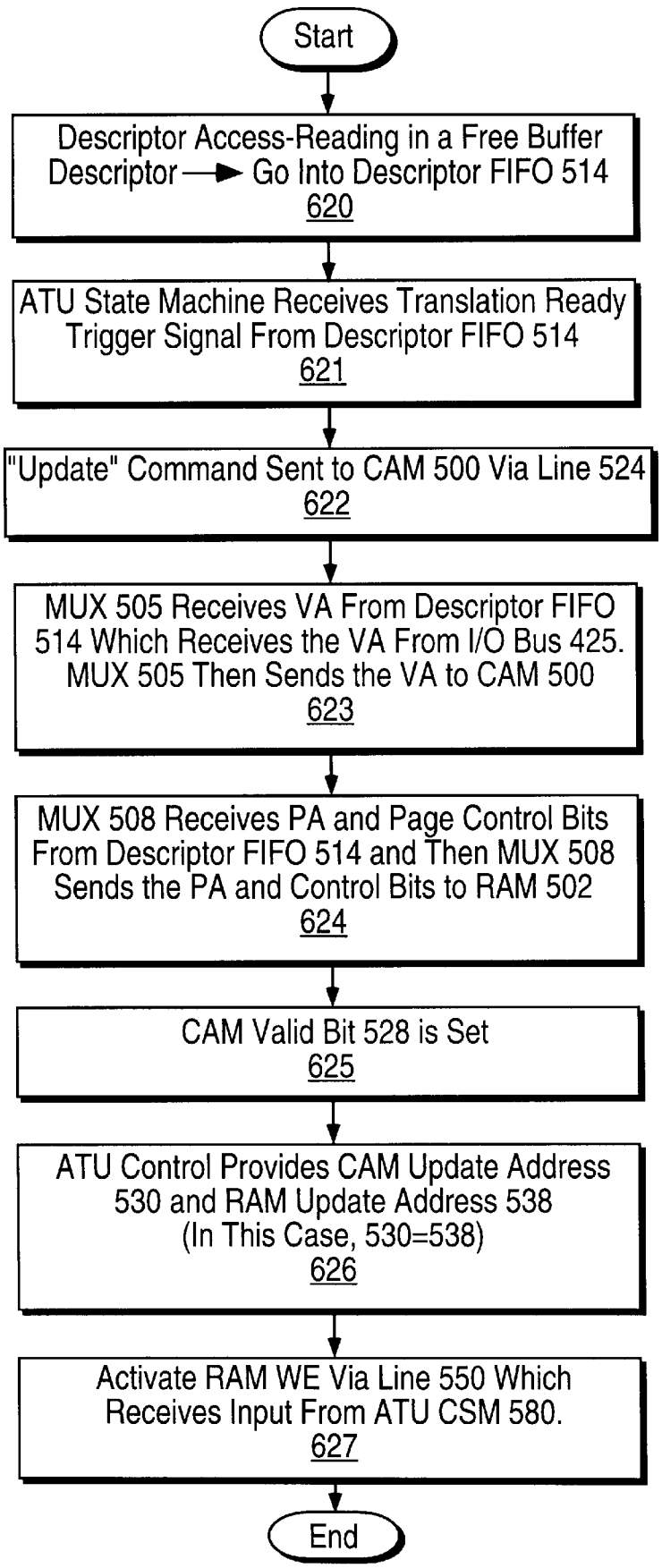
FIG. 6C is a flow chart that illustrates a hardware translation load sequence of the address translation unit.

Referring to FIG. 6C, a hardware translation load is illustrated in the following flowchart. In step 620, ATU state machine 600 is taken out of its idle state by a trigger. The trigger is a descriptor access and a free buffer descriptor is read which then tells the ATU state machine to access descriptor FIFO 514. In the next step 621, ATU state machine then receives a translation ready trigger signal from descriptor FIFO 514. An UPDATE command is then sent to CAM 500 via line 524 as shown in step 622. Next, in step 623, MUX 505 receives a virtual address (VA) from descriptor FIFO 514 which received the VA from input bus 425 (shown in FIG. 4). The MUX 505 then sends a VA via line 529 to CAM 500. En step 624, MUX 508 receives the PA and the PA control bits from descriptor FIFO 514. MUX 508 then sends the PA and control bits for the physical address to RAM 502. The data input 548 into the RAM 502 is broken down into the PA, the entry status and the protection bits. In step 625, the CAM valid bit 528 is set (i.e., set to be valid). The ATU control state machine 580 then provides CAM 500 with update address 530 and RAM update address 538. In this case, the CAM update address 530 and the RAM update address 538 are the same value because there is a one-to-one correspondence between the entry number of the virtual address and the physical address in order to maintain an association between the VA and the PA.

In a preferred embodiment, the ATU control state machine is specifically controlled by an ATU replacement algorithm (which is discussed in a patent application titled "A Circuit and Method for Replacement of Address Translations" which is owned by the assignee of the present invention). The ATU control state machine also has an ATU lock mechanism and an ATU flush management that is discussed in greater detail in two other applications, titled "A Circuit and Method for Segregating Memory in an Address Translation Unit" and "A Circuit and Method for Flush Checking Memory of an Address Translation Unit", respectively. These two applications are also owned by the assignee of the present invention. In the final step 627, the RAM write enable (WE) is activated via line 550 which receives its input from ATU Control State Machine 580. The hardware translation load is completed at this point.

Figure 6D:
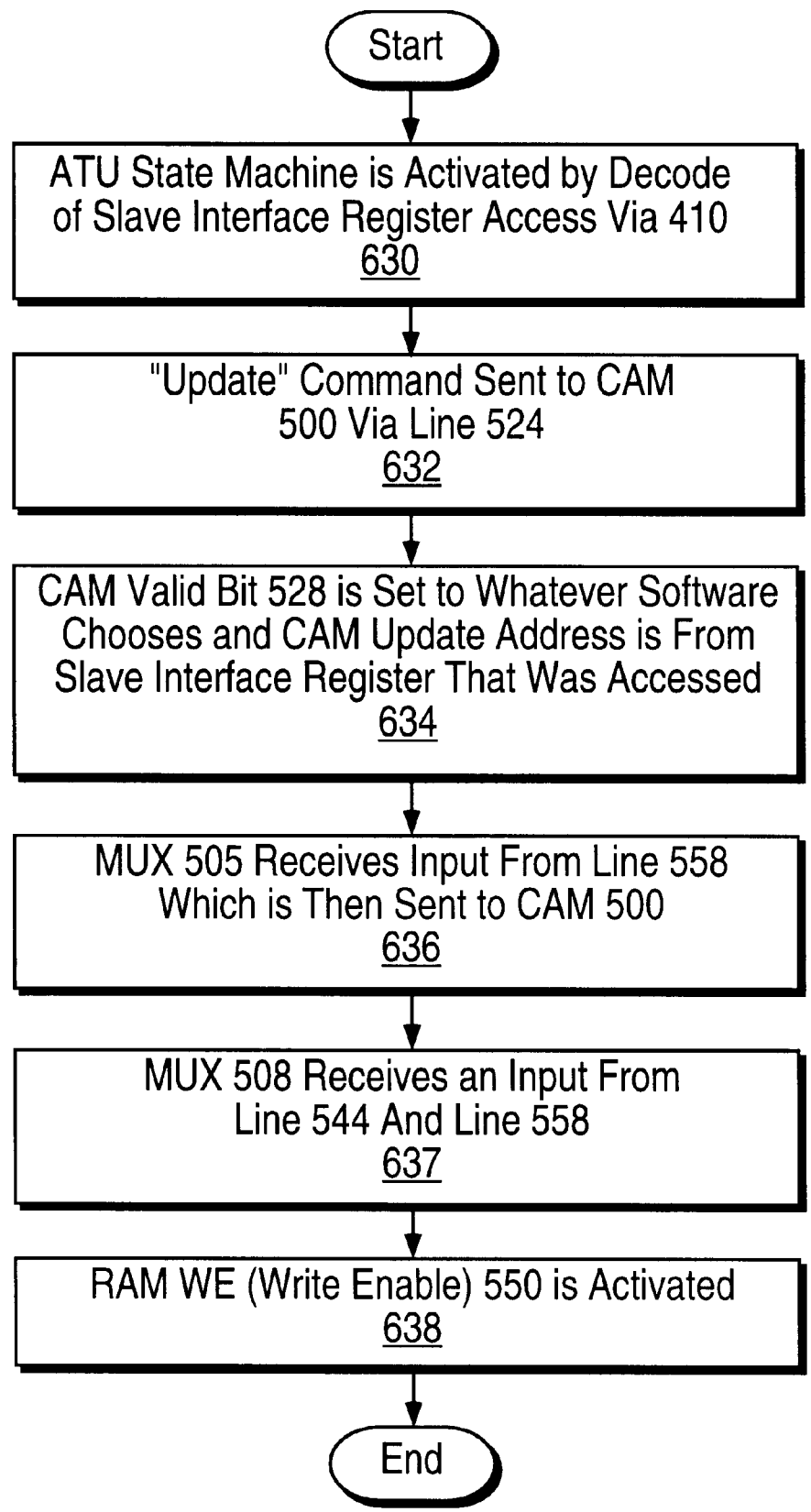
FIG. 6D is a flow chart that illustrate a software translation load cycle of the address translation unit.

A flow chart of a software translation load is illustrated in FIG. 6D. In step 630, the ATU state machine 600 is triggered or activated by a decode of slave interface register access via slave interface 410. The slave interface 410 is connected to the ATU 450 through bus or line 558. In the next step 632, an UPDATE command is sent to CAM 500 via line 524. The CAM valid bit 528 is set to whatever the software chooses and the CAM update address 530 is from the slave interface register that was accessed earlier in step 630, as shown in step 634. The next step 636, is when MUX 505 receives a VA input (that was manually written by software) from line 558 which is then sent via line 529 to CAM 500. The input 529 is a virtual address that needs to be translated. In step 637, MUX 508 receives an input from line 544 which is connected to line 558. The input 544 is the physical address (which was manually written by software) that corresponds to the virtual address that was sent to the CAM 500. The RAM WE 550 is also activated in step 638. The software translation load cycle is now completed and the ATU state machine returns to its idle state 600.

Figure 6E:
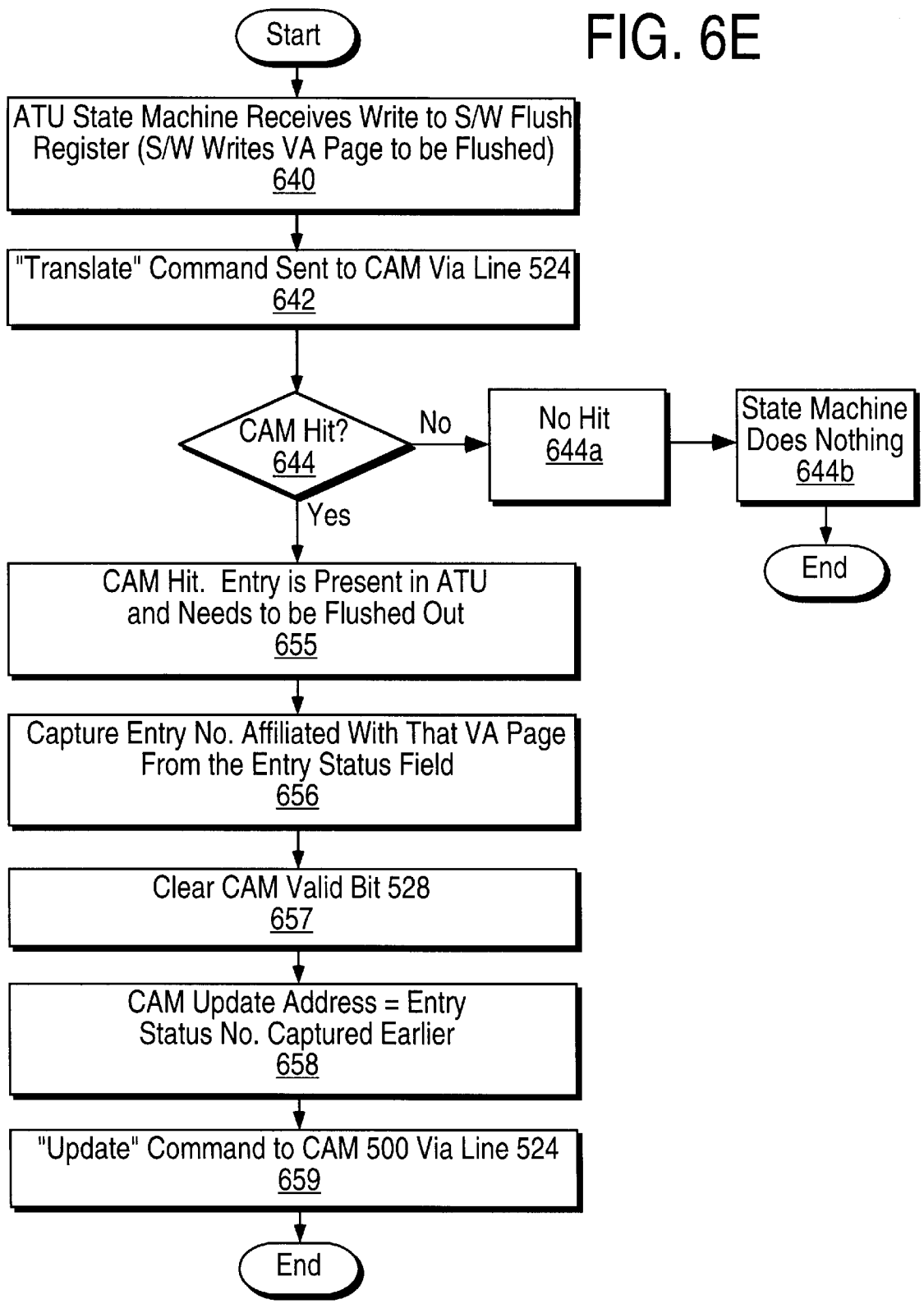
FIG. 6E is a flow chart illustrating a software flush cycle of the address translation unit.

A flow chart of a software flush code is illustrated in FIG. 6E. The software flush alone is sufficient to maintain coherency between I/O MMU 250 within bridge element 240, and the ATU 450. However, the replacement algorithm in the hardware, in one embodiment, also helps to maintain consistency between a system I/O MMU and the ATU 450 by also performing a flush. The hardware flush provides higher system performance than a software flush as outlined in a copending application titled "A Circuit and Method for Flush Checking Memory of an Address Translation Unit."

Referring to FIG. 6E, the ATU state machine receives a "write" to software flush register. In other words, the software writes the VA page that needs to be flushed into the software flush register as shown in step 640. In step 642, the TRANSLATE command is then sent to CAM 500 via line 524. The state machine, in step 644, monitors the CAM-hit signal 536. If there is "no hit", (i.e., the virtual address entry is "not present in the ATU"), there is no entry to be flushed out as shown in step 644A. The ATU control state machine 580 does nothing in step 644B and the software flush cycle then ends.

A different pathway is taken if the answer is "yes" to decision diamond 644. In step 655, the CAM's hit signal 536 signifies a CAM hit. This means that the entry (VA page to be flushed) is present in the ATU 318 and needs to be flushed out. In step 656, the entry number affiliated with that VA page is captured from the entry status field held in the RAM 502. The CAM valid bit 528 is cleared (i.e., set to invalid). The CAM update address 530 is equal to the entry status number that was captured earlier 656 as shown in step 658. Next, in step 659, an UPDATE command is sent to CAM 50 via line 524 which is controlled by ATU control state machine 580. Once the software flush is completed, the cycle ends.

A flow chart of a hardware translation load cycle with flush check enabled is shown in FIG. 6F. The flush check is affiliated with the hardware translation load. The address should not be in the ATU because it is a new virtual-physical mapping. If the address is present then that means that the address was not flushed out previously. Before the flush check (which is basically a debug operation) begins, the flush check mode is established. A hardware translation load trigger, as shown in step 651, takes the ATU Control State Machine 580 out of its idle state. In the next step 653, a TRANSLATE command is sent to CAM 500 via line 524. At the next step 655, the ATU 450 monitors the CAM-hit signal 536 to determine if there is a CAM-Hit. If there is no CAM-Hit, step 655a shows that everything is fine. In other words, software had flushed the previous translation so the CAM-hit signal reveals there is no CAM-Hit and the flush check ends.

If the answer to decision diamond 655 is "yes", which means that there is a CAM hit, then the (unflushed) translation is found as shown in step 655b. In step, 656, the translation is made an "ATU miss" so that a virtual address is issued on bus 516 to I/O MMU 250. The system I/O MMU 250 is then left to deal with the error instead of the ATU 450. Optionally, as shown in decision diamond 657, the ATU 450 could record the VA from line 522 and record the PA issuing on bus 562 as shown in step 658. Then in step 659, the ATU 450 generates an interrupt to the CPU (central processing unit) in step 659 if the option is not exercised or after the option is exercised.

The foregoing description provides an example of an ATU implemented in a network interface card in a DVMA system, although the ATU may also operate within a DMA system. It will be appreciated that numerous modifications may be made in practicing the present invention without departing from the spirit and scope of the invention, which is defined by the following claims.

I claim:

1. A method of utilizing an address translation unit (ATU) adapted to execute one of a plurality of at least three different cycles and implemented within a network interface card that is coupled to a computer system via an Input/Output bus, said method comprising the following steps:

a) causing a state machine to control said address translation unit, said state machine having a plurality of states wherein each state corresponds to one of said plurality of cycles, and each of said plurality of cycles causes said ATU to perform one of a corresponding plurality of functions; and (b) providing a condition that causes said state machine to leave a first state and to enter another one of said plurality of states; and (c) causing said state machine to issue a set of instructions to said ATU so that said ATU executes one of said plurality of cycles.

2. The method of claim 1, wherein said first state is an inactive state and said second state is an activated state.

3. The method of claim 1, wherein one of said cycles is a translate cycle, comprising the following steps:
   a) transmitting a virtual address to a memory element;
   b) transmitting a TRANSLATE command to said memory element; and
   c) determining whether said virtual address matches an entry in said memory element.

4. The method of claim 3, further including the following step:
   transmitting a virtual address to a first select element which then transmits said virtual address to said memory element.

5. The method of claim 4, wherein said first select element is a multiplexer.

6. The method of claim 3, further comprising the following steps:
   a) determining that said virtual address does not match an entry in said memory element; and
   b) transmitting said virtual address to said input/output bus.

7. The method of claim 3, further comprising the following steps:
   a) determining that said virtual address matches an entry in said memory element;
   b) locating corresponding physical address of said entry in a RAM element; and
   c) determining whether there is a protection violation.

8. The method of claim 7, further comprising the following steps:
   a) determining that there is a protection violation;
   b) setting an ATU-hit signal to false; and
   c) transmitting said virtual address on said input/output bus.

9. The method of claim 7, further comprising the following steps:
   a) determining that there is no protection violation;
   b) reading a location in said RAM element that contains a physical address translation affiliated with said virtual address; and
   c) transmitting said physical address on said input/output bus.

10. The method of claim 1, wherein one of said cycles is a hardware translation load cycle comprising the following steps:
    a) providing said condition, which is a descriptor access;
    b) causing a descriptor FIFO (that is coupled to a memory element and a RAM element) to send a "translation ready" signal to said state machine;
    c) transmit an UPDATE command to said memory element;
    d) providing a virtual address to said memory element;
    e) providing a physical address and said physical address control bits to said RAM element;
    f) setting a memory element valid bit;
    g) providing an update address to said memory element;
    h) providing a RAM update address to said RAM element; and
    i) providing page protection bits to said RAM element.

11. The method of claim 10, further comprising the step of:
    providing a virtual address from said descriptor FIFO to a select element.

12. The method of claim 10, further comprising the following step:
    activating a RAM write-enable function.

13. The method of claim 10, wherein said steps of providing said update address and providing said RAM update address is performed by said state machine utilizing a replacement algorithm.

14. The method of claim 1, wherein one of said cycles is a software translation load cycle comprising the following steps:
    a) decoding a slave interface register access;
    b) providing an UPDATE command to a memory element;
    c) setting a memory element valid bit to a predetermined value;
    d) providing a memory update address from said slave interface register access;
    e) providing a virtual address to said memory element;
    f) providing a physical address to a RAM element from a second select element; and
    g) activating a RAM write-enable function.

15. The method of claim 14, further including the following step:
    providing a virtual address from said slave interface register access to a first select element which is coupled to said memory element.

16. The method of claim 15, further comprising the following step:
    providing a physical address from said slave interface register access to a second select element which is coupled to a RAM element.

17. The method of claim 1, wherein one of said cycles is a software flush cycle comprising the following steps:
    a) providing said condition which is writing to a software flush register to specify a virtual address page that needs to be flushed;
    b) providing a TRANSLATE condition to a memory element;
    c) providing a virtual address to said memory element; and
    d) monitoring a Hit signal to determine if there is a Hit, wherein a Hit signifies that said VA was found in said memory element.

18. The method of claim 17, further including the following steps:
    a) determining that there is not a Hit which means said virtual address page was not present in said ATU; and
    b) ending said software flush cycle.

19. The method of claim 17, further including the following steps:
    a) determining that there is a Hit which means said virtual address page needs to be flushed from said ATU;

b) capturing an entry number affiliated with said virtual address page;

c) clearing Valid Bit;

d) providing an Update Address to said memory element; and e) providing an UPDATE command to said memory element.

20. The method of claim 19, wherein said Update Address equals said entry number that was captured.

21. The method of claim 1, wherein one of said cycles is a hardware translation load cycle with flush check enabled, the cycle comprising the following steps:

a) establishing a flush check mode;

b) providing a hardware translation load trigger that will cause said state machine to become activated;

c) transmitting a TRANSLATE command to a memory element;

d) providing said virtual address to said memory element; and e) monitoring a Hit signal to determine whether there is a Hit, wherein a Hit means that a matching virtual address translation was found.

22. The method of claim 21, further comprising the step of:

providing a virtual address to a select element which is coupled to said memory element.

23. The method of claim 21, further including the following steps:

a) determining that there was not a Hit which means a missing flush was not detected; and b) ending said flush check.

24. The method of claim 21, further including the following step:

determining that there was a Hit which means a matching translation was found.

25. The method of claim 24, further including the following steps:

a) making said translation an ATU miss; and b) transmitting said virtual address on said I/O bus.

26. The method of claim 25, further comprising the step of:

generating an interrupt to said computer system.

27. The method of claim 25, further including the following steps:

a) recording said virtual address;

b) recording a physical address being transmitted from said RAM element; and c) generating an interrupt to said computer system.

* * * * *